July 26, 1927.
F. B. CALDWELL
1,636,986
TRIPPER FOR DUPLEX BELT CONVEYERS
Filed Sept. 7, 1926
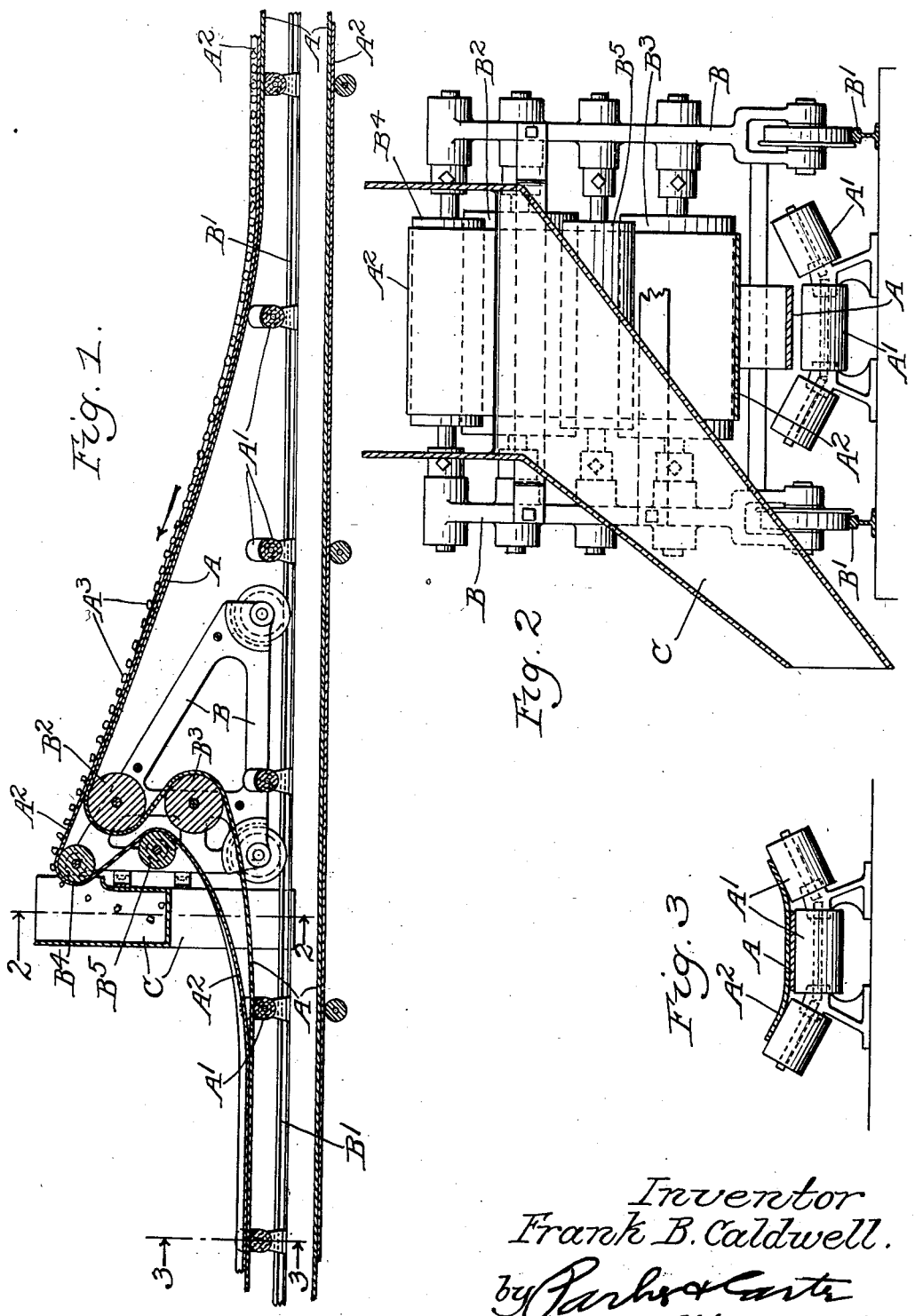
Inventor
Frank B. Caldwell.
by Parker & Carter
Attorneys.

Patented July 26, 1927.

1,636,986

UNITED STATES PATENT OFFICE.

FRANK B. CALDWELL, OF OAK PARK, ILLINOIS, ASSIGNOR TO LINK-BELT COMPANY, OF CHICAGO, ILLINOIS, A CORPORATION OF ILLINOIS.

TRIPPER FOR DUPLEX BELT CONVEYERS.

Application filed September 7, 1926. Serial No. 133,793.

My invention relates to a new and improved type of tripper adjustably movable along the working side of the duplex belt, whereby the belt may be caused to discharge its load intermediate its two ends at selected points, and whereby the power belt and the wear sheet carried thereby may be separately guided over idler pulleys so as to prevent any differential action between the power belt and the wear sheet. Other objects of the invention will appear from time to time in the specification.

By duplex belt I mean the type of belt wherein there is a power belt, which is preferably flat although it may be troughed, supporting and driving by friction contact only a wear sheet which overlies the power belt, and which preferably is wider than the power belt and trough to carry material. The wear sheet, since it carries no load other than the friction load between it and the power belt and the weight of the material, may be relatively thin and very flexible, while the power belt will be preferably thicker and stiffer.

If these two belts, traveling in unison, are sent over the usual two or more idlers in a tripper mechanism, a differential action would be set up between the power belt and the wear sheet which will ultimately cause difficulty and trouble, owing to the different radii about which the two will be bent as they pass over the pulleys.

My invention therefore contemplates the use of a tripper having two pairs of idler pulleys, the idler pulley for the wear sheet being in front of and perhaps slightly above the first idler pulley for the power belt and the second idler pulley for the wear sheet being also in front of and somewhat above the second idler pulley. Thus the two belts as they pass through the idler zone, where discharge from the belts takes place, will be traveling separately over separate pulleys, and no differential action can occur and the relation between the belts need not be varied. The amount of slack in each belt taken up by the idler pulley may or may not be the same. The laden wear sheet, after it has passed over its own idler pulley and bent back for discharge, will be deposited back on the power belt and go on as before without relative movement between the wear sheet and belt thereafter.

My invention is illustrated more or less diagrammatically in the accompanying drawings, wherein:

Figure 1 is a longitudinal section of a duplex belt showing only the tripper mechanism and the belt parts adjacent thereto;

Figure 2 is a section along the line 2—2 of Fig. 1;

Figure 3 is a section along the line 3—3 of Fig. 1.

Like parts are indicated by like characters throughout the specification and drawings.

A is a power belt traveling over the idler pulleys $A^1$; $A^2$ is a wear sheet riding upon the power belt in frictional contact therewith; $A^3$ is the load or charge of material traveling along and carried by the wear sheet. The driving and driven head and tail end pulleys for the belt are not shown, as they form no part of my present invention.

B is a tripper frame. It is movable along tracks $B^1$ along the line of the belt. On this frame are power belt idler pulleys $B^2$ and $B^3$, spaced apart to take up a certain amount of slack in the power belt. In front of and preferably with its periphery slightly above the idler pulley $B^2$ is a wear sheet idler pulley $B^4$. Below and slightly behind the pulley $B^4$ is a wear sheet idler pulley $B^5$. The wear sheet $A^2$ is separated from the power belt A, the power belt passing over pulleys $B^2$ $B^3$ and the wear sheet over pulleys $B^4$ $B^5$. This arrangement does away with any differential action or slipping between the wear sheet and the power belt such as would occur if these two belts pass over the same pulley or pair of pulleys; and the relation between the wear sheet and the power belt is therefore the same at the point where they again come into contact.

C is a chute carried by the tripper frame B, located below and in front of the idler pulley $B^4$, so that the material carried by the wear sheet will be discharged from the sheet as it passes over the pulley $B^4$ onto the chute and thence conveyed or discharged to one side in any suitable manner.

Obviously the amount of slack taken up by the pulleys in the wear sheet and in the power belt will not be the same. The point is that the lineal movement of each over the pulleys during the same time interval must be the same to prevent differential action. The wear sheet might conceivably and under some conditions be drawn out with more slack than the power belt or with less as the case may be.

The tripper which I have shown adjustable longitudinally of the belt might be fixed and in some conditions a number of movable trippers might be fixed along the belt.

I claim:

1. In a belt conveyer, a power belt and a wear sheet carried thereby and in frictional contact therewith, a tripper frame arranged intermediate the ends of the belt, and separate idler pulleys on the tripper frame over which the power belt and the wear sheet separately travel.

2. In a belt conveyer, a power belt and a wear sheet carried thereby in frictional contact therewith, a tripper frame arranged intermediate the ends of the belt and separate pairs of idler pulleys on the frame over which the power belt and the wear sheet travel, the relation between the pulleys of each pair being such that the amount of slack in each belt taken up by the pulleys in the same.

3. In a belt conveyer, a power belt and a wear sheet carried thereby in frictional contact therewith, a tripper frame arranged intermediate the ends of the belt, an idler pulley on the frame over which the power belt travels, a second idler pulley below the first about which the power belt travels, an idler pulley arranged in front of the first named idler pulley and so positioned that a tangent of both said idler pulleys is substantially in continuation of the path of the two belts as they approach the first idler pulley, the wear sheet traveling over the third idler pulley in a direction sharply inclined to the path of the power belt as it leaves the first idler pulley.

4. In a belt conveyer, a power belt and a wear sheet carried thereby in frictional contact therewith, a tripper frame arranged intermediate the ends of the belt, an idler pulley on the frame over which the power belt travels, a second idler pulley below the first about which the power belt travels, an idler pulley arranged in front of the first named idler pulley and so positioned that a tangent of both said idler pulleys is substantially in continuation of the path of the two belts as they approach the first idler pulley, the wear sheet traveling over the third idler pulley in a direction sharply inclined to the path of the power belt as it leaves the first idler pulley, a fourth idler pulley over which the wear sheet travels after it leaves the third idler pulley and from which it returns to contact with the power belt.

5. In a belt conveyer, a power belt and a wear sheet carried thereby in frictional contact therewith, a tripper frame arranged intermediate the ends of the belt, an idler pulley on the frame over which the power belt travels, a second idler pulley below the first about which the power belt travels, an idler pulley arranged in front of the first named idler pulley and so positioned that a tangent of both said idler pulleys is substantially in continuation of the path of the two belts as they approach the first idler pulley, the wear sheet traveling over the third idler pulley in a direction sharply inclined to the path of the power belt as it leaves the first idler pulley, a fourth idler pulley over which the wear sheet travels after it leaves the third idler pulley and from which it returns to contact with the power belt, the distance between the first and second and third and fourth idler pulleys being such that the slack taken up by them from the power belt and the wear sheet is substantially the same.

6. In a belt conveyer, a power belt and a wear sheet carried thereby and in frictional contact therewith, a tripper frame arranged intermediate the ends of the belt, and separate idler pulleys on the tripper frame over which the power belt and the tripper belt separately travel, the arrangement being such that the length of belt passing over the separate sets of idler pulleys is the same in a given length of time both for the power belt and the wear sheet.

Signed at Chicago, county of Cook and State of Illinois, this 26th day of August, 1926.

FRANK B. CALDWELL.